United States Patent
Jeong et al.

(10) Patent No.: US 11,753,033 B2
(45) Date of Patent: Sep. 12, 2023

(54) CONTEXT-AWARE NAVIGATION PROTOCOL FOR SAFE DRIVING

(71) Applicant: RESEARCH & BUSINESS FOUNDATION SUNGKYUNKWAN UNIVERSITY, Suwon-si (KR)

(72) Inventors: Jae Hoon Jeong, Busan (KR); Bien Aime Mugabarigira, Suwon-si (KR); Yiwen Shen, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 282 days.

(21) Appl. No.: 17/088,970

(22) Filed: Nov. 4, 2020

(65) Prior Publication Data
US 2021/0129865 A1    May 6, 2021

(30) Foreign Application Priority Data
Nov. 4, 2019    (KR) .......... 10-2019-0139812

(51) Int. Cl.
| | |
|---|---|
| B60W 60/00 | (2020.01) |
| G08G 1/16 | (2006.01) |
| B60W 30/09 | (2012.01) |
| B60W 30/095 | (2012.01) |
| B60W 50/14 | (2020.01) |

(52) U.S. Cl.
CPC ........ *B60W 60/0015* (2020.02); *B60W 30/09* (2013.01); *B60W 30/0956* (2013.01); *B60W 50/14* (2013.01); *G08G 1/162* (2013.01)

(58) Field of Classification Search
CPC ............ B60W 60/0015; B60W 30/09; B60W 30/0956; B60W 50/14; G08G 1/162
See application file for complete search history.

(56) References Cited

U.S. PATENT DOCUMENTS

| | | | |
|---|---|---|---|
| 9,438,700 B2* | 9/2016 | Bonefas | H04L 69/08 |
| 10,553,112 B2* | 2/2020 | Gogic | G08G 1/096791 |
| 2013/0212195 A1* | 8/2013 | Bonefas | H04L 67/63 |
| | | | 709/206 |
| 2016/0156507 A1* | 6/2016 | Bonefas | H04L 69/18 |
| | | | 370/254 |
| 2017/0053530 A1* | 2/2017 | Gogic | H04W 4/46 |
| 2019/0051188 A1* | 2/2019 | Moustafa | G05D 1/0291 |

FOREIGN PATENT DOCUMENTS

WO    WO-2021040143 A1 *    3/2021

* cited by examiner

*Primary Examiner* — Tarek Elarabi
(74) *Attorney, Agent, or Firm* — NSIP Law

(57) ABSTRACT

Provided is a method for performing communication with a first vehicle in a vehicle network, including: receiving, from a second vehicle, mobility information of the second vehicle, the mobility information including 1) a cooperation context message (CCM) or 2) an emergency context message (ECM); and controlling traveling based on the mobility information, in which the CCM may include motion information of the second vehicle, and the ECM may include information notifying an emergency situation related to the second vehicle.

8 Claims, 11 Drawing Sheets

| 0 | | | | | | | | | 1 | | | | | | | | | 2 | | | | | | | | | 3 | |
|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |

| Type | Length | Message | Reserved1 |
|---|---|---|---|
| Reserved2 ||||
| Mobility Information ||||

[FIG. 1]
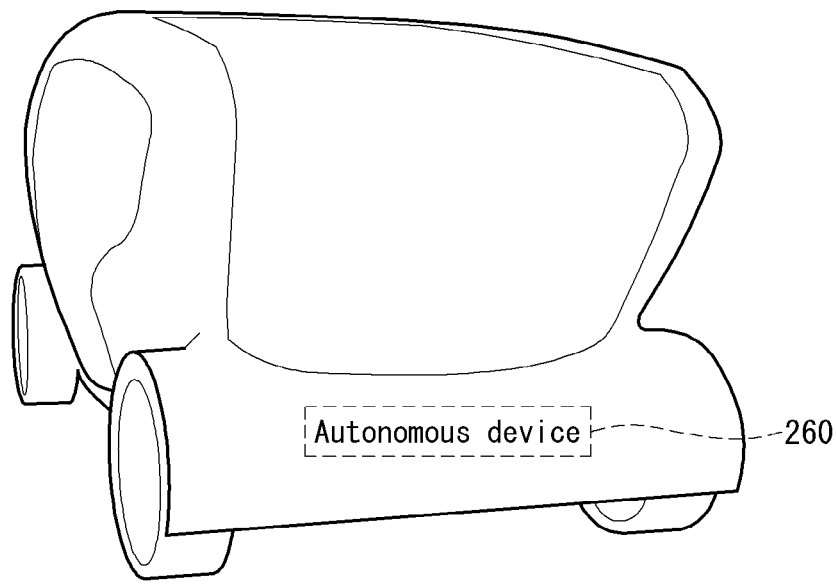
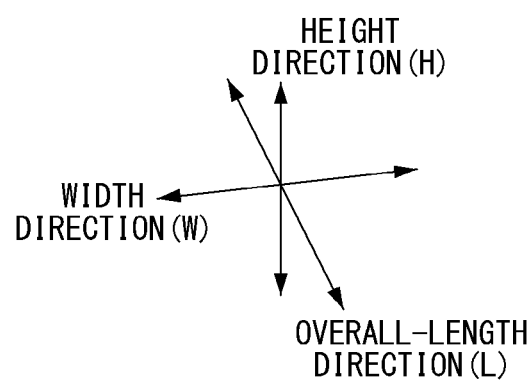
--Background Art--

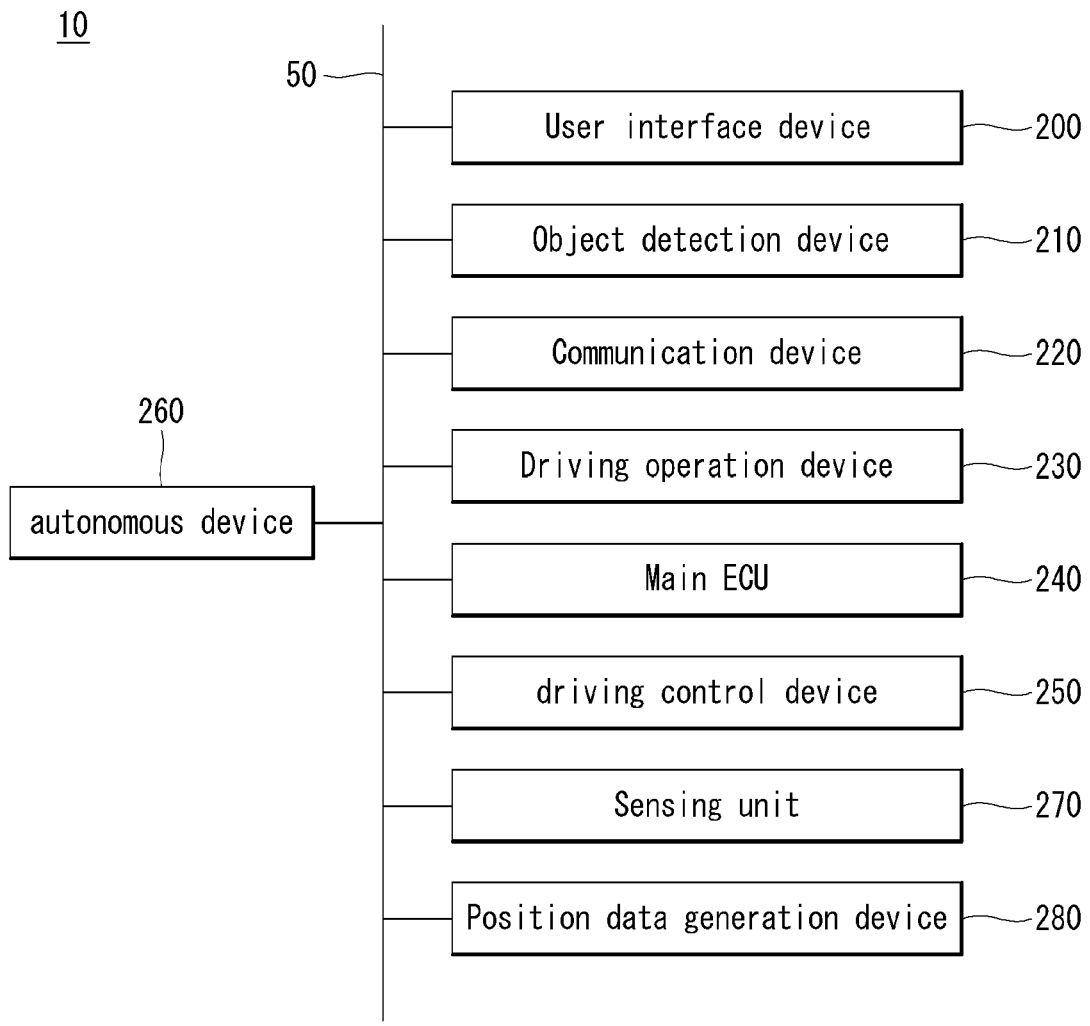
--Background Art--

【FIG. 3】
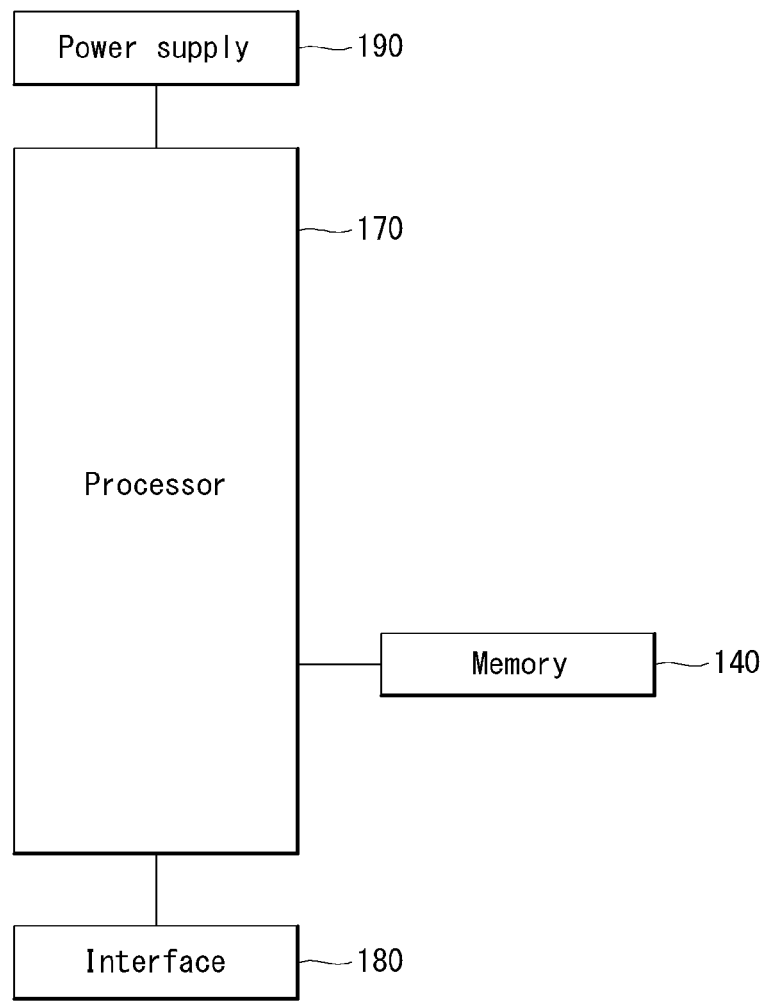
--Background Art--

[FIG. 4]
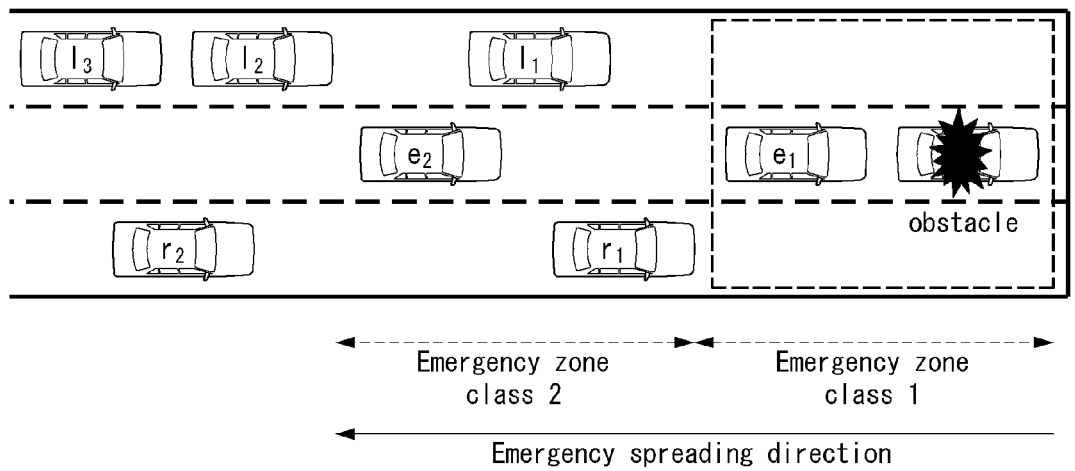

【FIG. 5】
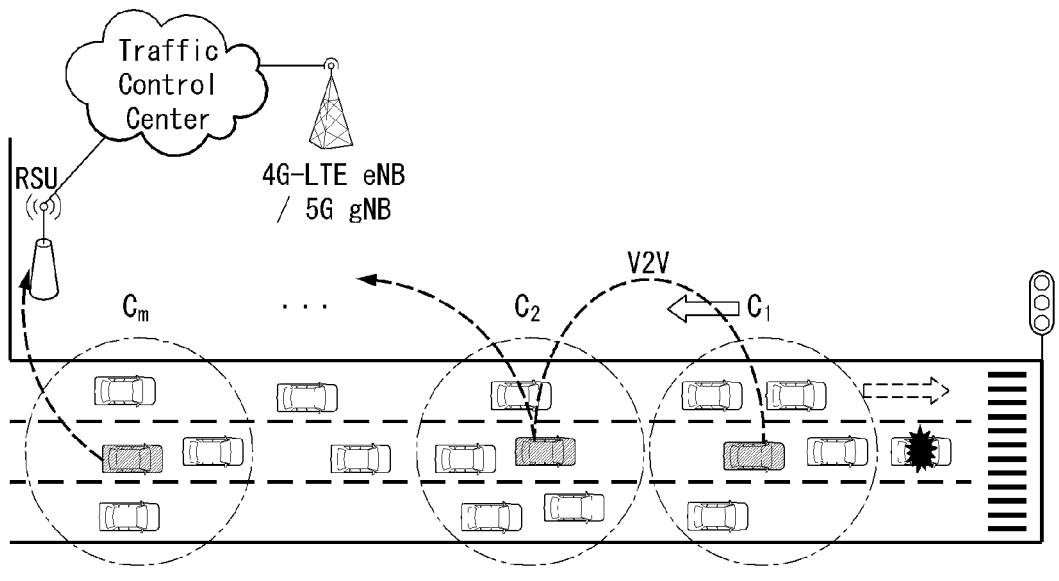
⇒ Communication direction
⇢ Driving direction
$C_1, C_2, C_3 \cdots$ Emergence vehicle clusters
【FIG. 6】
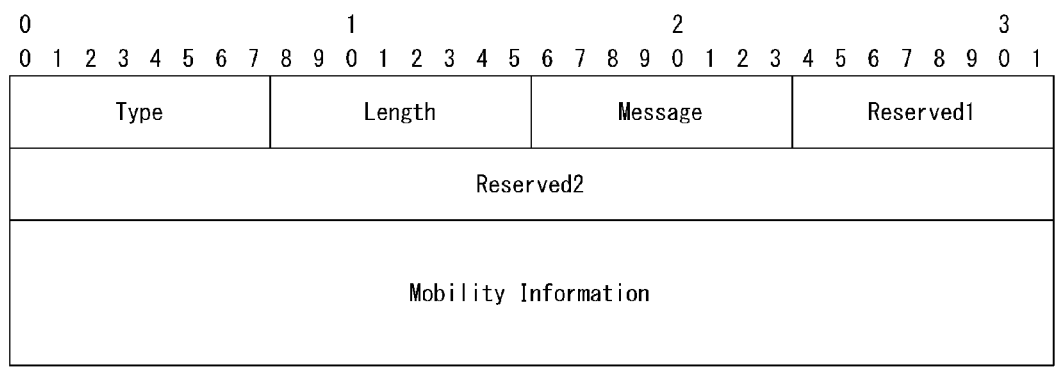

[FIG. 7]
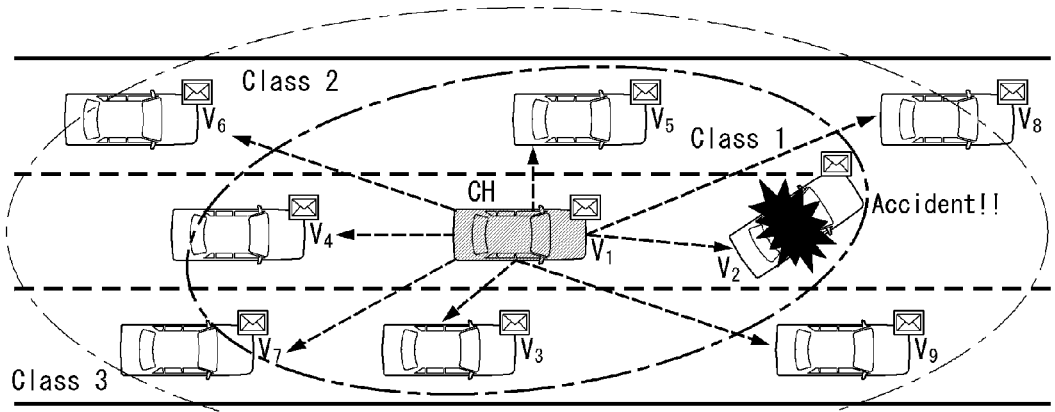
[FIG. 8]
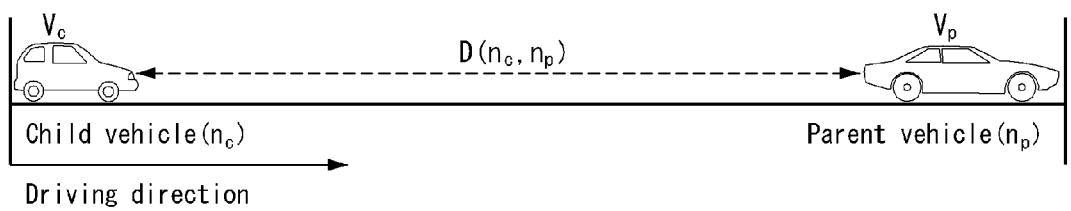
[Fig. 9]
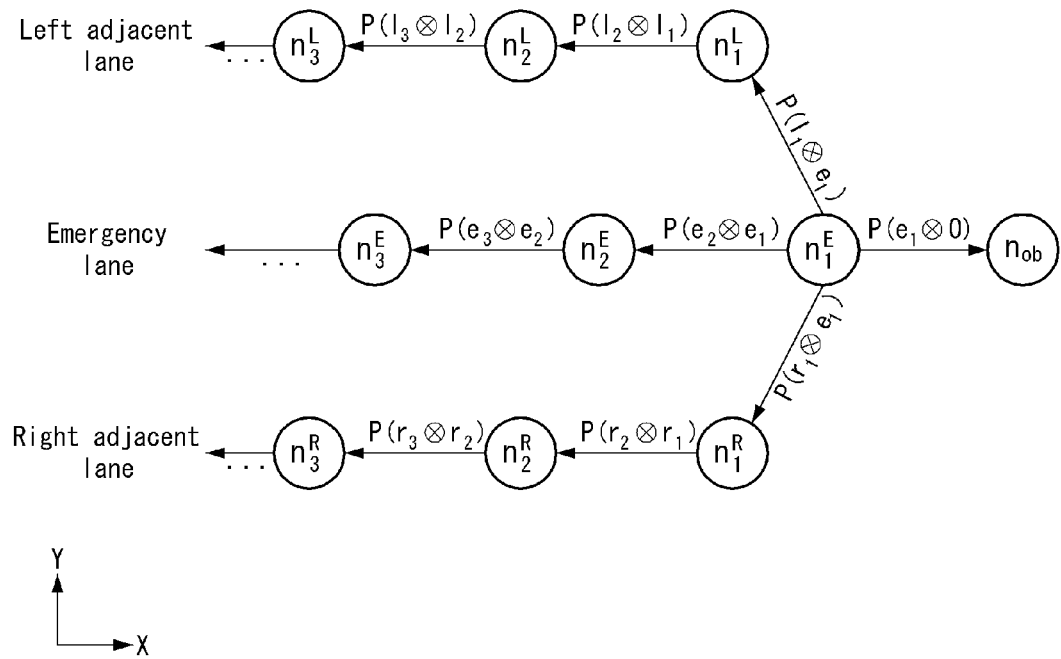

[FIG. 10]
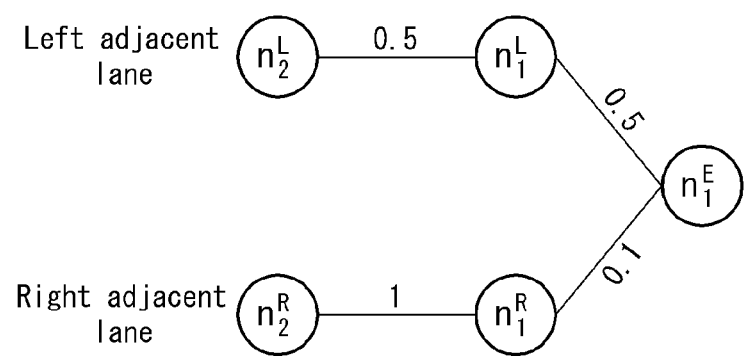

[FIG. 11]

Algorithm 1 Determine Emergency Maneuver Lane

1: function DETERMINE_MANEUVER_LANE($G = \mathcal{V}, E$) ▷ $G$ is the graph constructed by a set of vehicles $\mathcal{V}$ where each vehicle is identified by its position and speed
2:    $n_p \leftarrow n_1^E$ ▷ initialize the parent node $n_p$ to the most risky vehicle to collide with $n_{ob}$
3:    for each vertex $v$ in $\mathcal{V}$ do
4:       if $n_c \neq null$ then ▷ Compute the edge cost when the current vertex has a predecessor
5:          $T_c \leftarrow Compute\_Time\_To\_Collision(n_c, n_p)$
6:          $P_{c,p} \leftarrow Compute\_Probability(T_c)$
7:          $v.p \leftarrow P_{c,p}$ ▷ Assign the collision probability as the metric of each graph edge cost
8:       end if
9:    end for
10:   $L_x \leftarrow 0$ ▷ Candidate maneuver lane index which varies from 0 to 2 for a 3 lanes road segment
11:   $Q_{lane} \leftarrow 0$ ▷ Maneuvers towards a lane which has the greatest value of lane quality $Q_{lane}$
12:   for each lane $l$ in $L$ do ▷ $L$ is a set of road lanes and checking the neighboring lanes of the defected lane that may be two elements (right and left lanes), or only one lane side
13:       $Q_l \leftarrow Calculate\_Lane\_Quality(\mathcal{V})$
14:       if $Q_{lane} < Q_l$ then
15:          $Q_{lane} \leftarrow Q_l$
16:          $L_x \leftarrow l$
17:       end if
18:   end for
19:   return $L_x$
20: end function

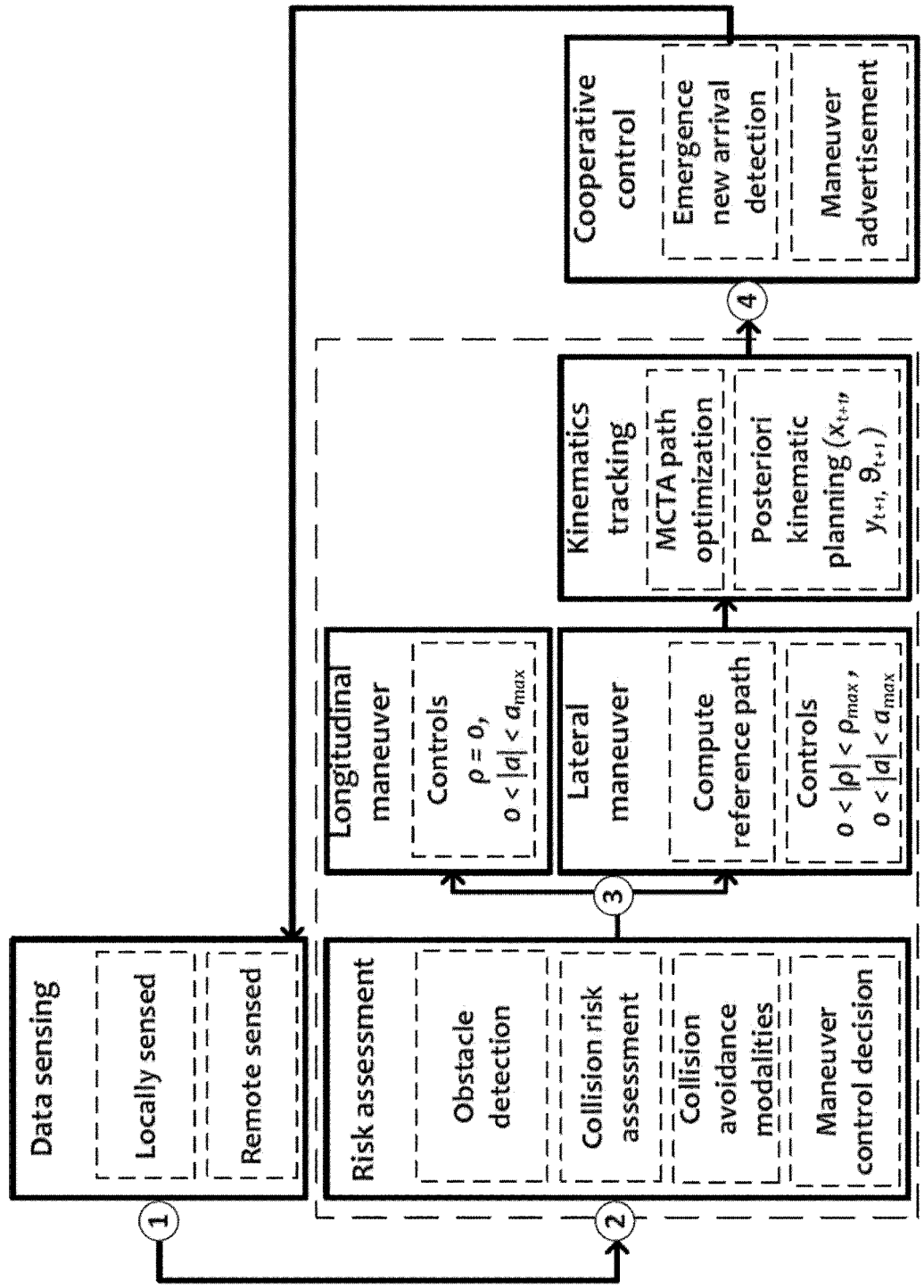
[FIG. 12]

[FIG. 13A]
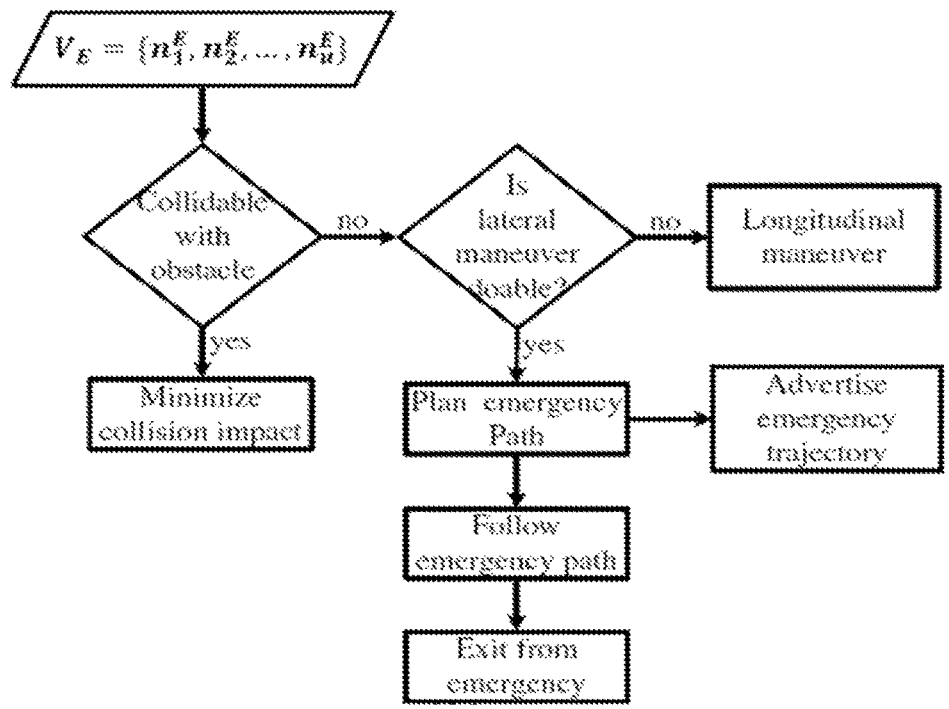
(a) Emergency Vehicle maneuver procedure
[FIG. 13B]
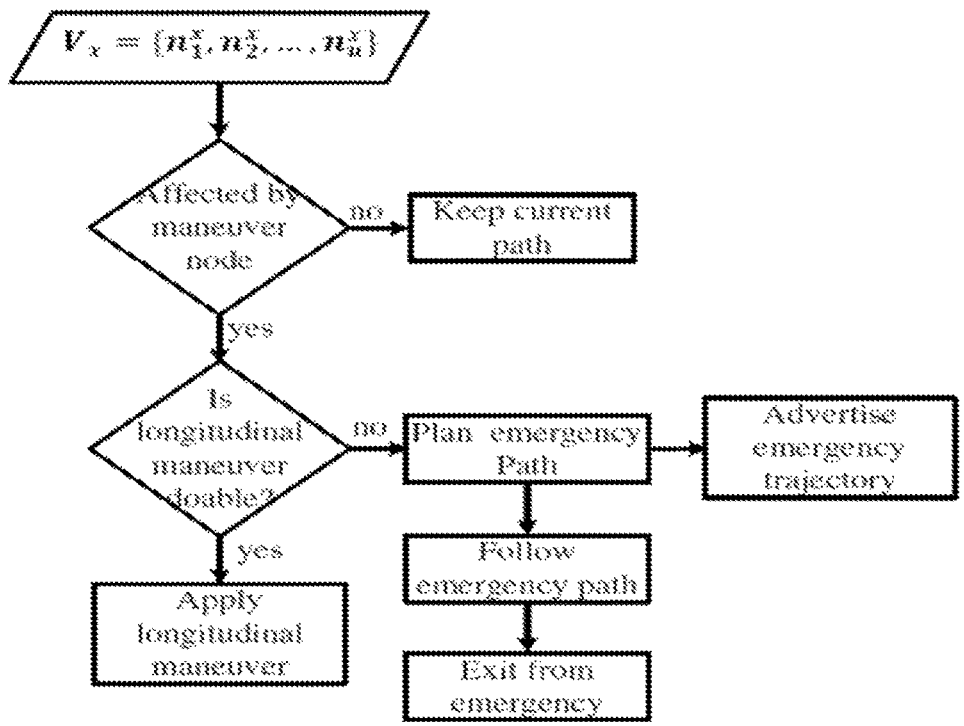
(b) Maneuver effects in a maneuver lane

[FIG. 14]
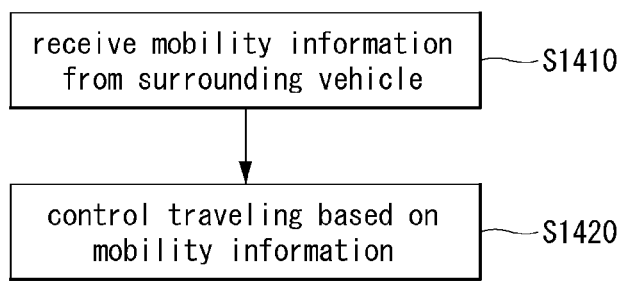
[FIG. 15]
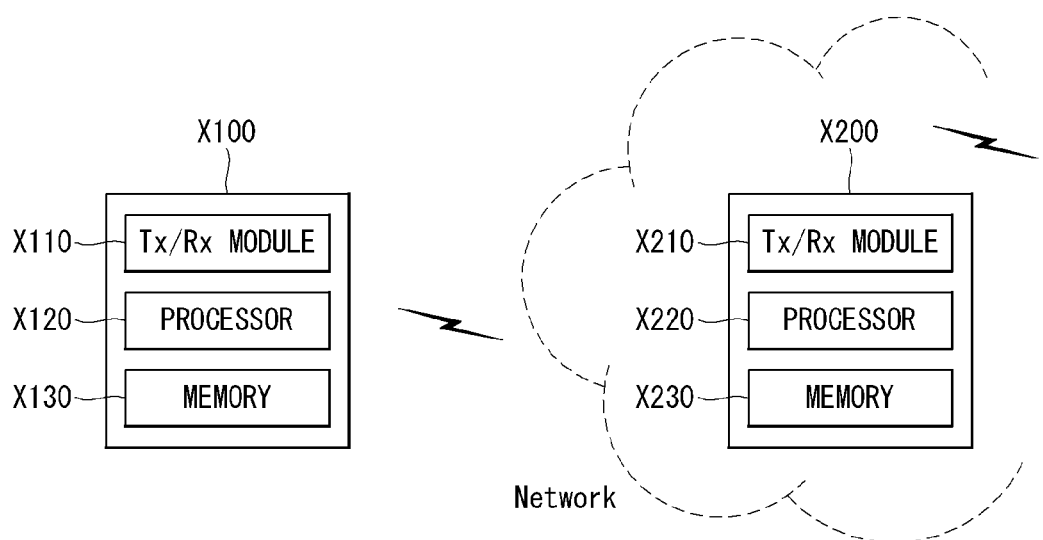

ized the IEEE 802.11-OCB (Outside the Context of a Basic Service Set) in consideration of the high-speed mobility of a vehicle network based on dedicated short-range communications (DSRC).

CONTEXT-AWARE NAVIGATION PROTOCOL FOR SAFE DRIVING

CROSS-REFERENCE TO RELATED APPLICATION

This application claims the benefit of Korean Patent Application No. 10-2019-0139812 filed on Nov. 4, 2019. The contents of this application are hereby incorporated by reference in its entirety.

BACKGROUND OF THE DISCLOSURE

Field of the Disclosure

The present disclosure relates to a vehicle control method, and more particularly, to definition of context-awareness navigation protocol (CNP) that increases safety of a vehicle traveling on a road.

Related Art

Vehicular Ad Hoc networks (VANET) have been studied for intelligent transportation Systems (ITS) such as driving safety, efficient driving, and entertainment. IEEE has standardized the IEEE 802.11-OCB (Outside the Context of a Basic Service Set) in consideration of the high-speed mobility of a vehicle network based on dedicated short-range communications (DSRC).

The Internet operates according to transmission control protocol/Internet protocol (TCP/IP) published by the Internet Engineering Task Force (IETF), in which the TCP/IP may be found in Request For Comments (RFC) 703 and RFC 791 issued by the IETF.

SUMMARY OF THE DISCLOSURE

The present disclosure provides a CNP that increases safety of a vehicle traveling on a road.

The present disclosure also provides a control method necessary in a dangerous situation to a vehicle by analyzing a driving risk of a vehicle through CNP.

Objects of the present disclosure are not limited to the above-mentioned objects. That is, other objects that are not mentioned may be obviously understood by those skilled in the art to which the present disclosure pertains from the following description.

In an aspect, a method for performing communication with a first vehicle in a vehicle network includes: receiving, from a second vehicle, mobility information of the second vehicle, the mobility information including 1) a cooperation context message (CCM) or 2) an emergency context message (ECM); and controlling traveling based on the mobility information, in which the CCM includes motion information of the second vehicle, and the ECM includes information notifying an emergency situation related to the second vehicle.

The mobility information may further include 1) an identifier for indicating the CCM or the ECM, and 2) movement information for indicating information related to the mobility of the second vehicle and/or information related to the emergency situation.

The ECM may have a higher priority value than the CCM.

The ECM may be included in the mobility information before the CCM and transmitted, based on the priority value.

The first vehicle may control member vehicles of a cluster including the first vehicle based on the mobility information.

The controlling of the traveling may include: measuring the emergency situation based on the identifier indicating the ECM; calculating a strategy for maneuvering the member vehicles based on the measured emergency situation; and transmitting a control message to the member vehicles based on the strategy.

The measuring of the emergency situation may include: detecting an obstacle related to the emergency situation; calculating a collision probability related to the obstacle; and determining a mode for avoiding the collision and a mode for maneuvering the member vehicles.

The calculating of the strategy may include: calculating a reference path for maneuvering the member vehicles.

A vehicle in which a first vehicle performs communication in a vehicle network, includes: a transceiver; a memory; and a processor that functionally controls the transceiver and the memory, in which the processor may receive, from a second vehicle, mobility information of the second vehicle through the transceiver, the mobility information including 1) a cooperation context message (CCM) or 2) an emergency context message (ECM), and may control traveling based on the mobility information, the CCM may include motion information of the second vehicle, and the ECM may include information notifying an emergency situation related to the second vehicle.

BRIEF DESCRIPTION OF THE DRAWINGS

FIG. 1 is a diagram illustrating a vehicle according to an embodiment of the present disclosure.

FIG. 2 is a control block diagram of a vehicle according to an embodiment of the present disclosure.

FIG. 3 is a control block diagram of an autonomous device according to an embodiment of the present disclosure.

FIG. 4 is a diagram illustrating a driving environment of a road to which the present disclosure can be applied.

FIG. 5 is an exemplary diagram of an emergency model using CNP to which the present disclosure can be applied.

FIG. 6 is a diagram illustrating a VMI option format to which the present disclosure can be applied.

FIG. 7 is an exemplary diagram of dynamic path planning of a CH to which the present disclosure can be applied.

FIG. 8 is an exemplary diagram of a collision scenario to which the present disclosure can be applied.

FIG. 9 is an exemplary diagram of a collision probability graph of an emergency vehicle to which the present disclosure can be applied.

FIG. 10 is an exemplary diagram of lane quality to which the present disclosure can be applied.

FIG. 11 is an exemplary diagram of an algorithm of determining an emergency maneuvering lane to which the present disclosure can be applied.

FIG. 12 is an exemplary diagram of an emergency vehicle tracking method to which the present disclosure can be applied.

FIGS. 13A and 13B are exemplary diagrams of a maneuver operation of a CM to which the present disclosure can be applied.

FIG. 14 is a diagram illustrating an embodiment to which the present disclosure can be applied.

FIG. 15 is an exemplary diagram of a general device to which the present disclosure can be applied.

The accompanying drawings, which are included as part of the detailed description to assist understanding of the present disclosure, illustrate embodiments of the present disclosure and explain the technical features of the present disclosure together with the detailed description.

DESCRIPTION OF EXEMPLARY EMBODIMENTS

Hereinafter, preferred embodiments according to the present disclosure will be described in detail with reference to the accompanying drawings. The detailed description to be disclosed below with the accompanying drawings is intended to describe exemplary embodiments of the present disclosure, and is not intended to represent only embodiments in which the present disclosure may be practiced. The detailed description below includes specific details to provide a thorough understanding of the present disclosure. However, those skilled in the art appreciates that the present disclosure may be practiced without these specific details.

In some cases, in order to avoid obscuring the concept of the present disclosure, well-known structures and devices may be omitted, or may be shown in a block diagram form centering on core capabilities of each structure and device.

Specific terms used in the following description are provided to aid understanding of the present disclosure, and the use of these specific terms may be changed to other forms within the scope of the technical spirit of the present disclosure.

FIG. 1 is a diagram illustrating a vehicle according to an embodiment of the present disclosure.

Referring to FIG. 1, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

FIG. 2 is a control block diagram of a vehicle according to an embodiment of the present disclosure.

Referring to FIG. 2, the vehicle 10 may include a user interface device 200, an object detection device 210, a communication device 220, a driving operation device 230, a main ECU 240, a driving control device 250, a autonomous device 260, a sensing unit 270, and a position data generation device 280. The object detection device 210, the communication device 220, the driving operation device 230, the main ECU 240, the driving control device 250, the autonomous device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near aside mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short-Range Communications) or WAVE (Wireless Access in Vehicular Environments) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5) Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous device 260. For example, the driving control device 250 can control a power train, a steering device and a brake device on the basis of signals received by the autonomous device 260.

7) Autonomous Device

The autonomous device 260 can generate a route for self-driving on the basis of acquired data. The autonomous device 260 can generate a driving plan for traveling along the generated route. The autonomous device 260 can generate a signal for controlling movement of the vehicle according to the driving plan. The autonomous device 260 can provide the signal to the driving control device 250.

The autonomous device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous device 260 can perform switching from a self-driving mode to a manual driving mode or switching from the manual driving mode to the self-driving mode. For example, the autonomous device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

FIG. 3 is a control block diagram of an autonomous device according to an embodiment of the present disclosure.

Referring to FIG. 3, the autonomous device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous device 260. The power supply 190 can be provided with power from a power source (e.g., a battery) included in the vehicle 10 and supply the power to each unit of the autonomous device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous device 260 may include at least one printed circuit board (PCB). The memory 140, the interface 180, the power supply 190 and the processor 170 may be electrically connected to the PCB.

The present disclosure proposes a context-aware navigation protocol (CNP) for driving safety of a vehicle. The CNP is a protocol that enhances driving safety by utilizing an advanced sensing technology and a vehicle network. Through the CNP, each vehicle may detect and bypass obstacles, detect and recognize the driving environment, and avoid accidents.

FIG. 4 illustrates a driving environment of a road to which the present disclosure can be applied.

Referring to FIG. 4, when an obstacle exists on a road, complexity of driving is illustrated. For example, when a vehicle suddenly stops in the middle of a lane (obstacle), an unexpected driving situation occurs in the following vehicles. e1 is directly related to the driving situation, and its response may affect driving of e2, l1, or r1, and the driving situation requests vehicles to create more complex driving scenarios and react to the driving situation.

For example, when an emergency risk is detected, the CNP can take action to quickly reset a vehicle's driving path. A cluster head (CH) may control an emergency routes and a safe route driving for cluster members (CMs), and the CNP may use minimal contour tracking algorithm (MCTA) to define and track an emergency route of a vehicle.

When the emergency risk causing a collision is detected too late, a collision may occur. The CNP may minimize damage to collision vehicles. A collision mitigation module of the CNP is a mechanism of suggesting collision strength by minimizing energy transfer between colliding vehicles.

In the present disclosure, the CNP was designed to have the following two safety goals. The first is a collision avoidance model that enables autonomous vehicles to safely travel when obstacles exist in a road section. The second is a model to ensure collision mitigation, that is, minimal collision impact for unavoidable accident scenarios.

Nodes of vehicular Ad-hoc networks (VANET) are composed of subroads such as roads and lanes. The CNP may consider a road segment $e_{ij}$ in which N vehicle sets moving from i to j are positioned at a specific moment t.

FIG. 5 is an exemplary diagram of an emergency model using CNP to which the present disclosure can be applied.

Referring to FIG. 5, the CNP may include m clusters (for example, $C=\{C_1, C_2, \ldots C_m\}$) in which vehicles are grouped.

A state of vehicle $n_i$ at a specific time t may be defined as in Equation 1 below.

$$s=[x_i y_i v_i \theta_i]^T \quad \text{[Equation 1]}$$

In Equation 1, $(x_i, y_i)$ is a position of a vehicle, $v_i$ is a speed, and $\theta_i$ is a moving direction.

In addition, the trajectory control input may be defined as in Equation 2 below.

$$u=[\rho_i \alpha_i]^T \quad \text{[Equation 2]}$$

Referring to Equation 2, $\rho_i$ is an angle and $\alpha_i$ is an acceleration.

In the case of a vehicle in which a distance between axes of two wheels is L, $\theta_i$ may be defined as Equation 3 below.

$$\theta_i = \frac{v_i}{L\tan(\rho_i)}. \quad \text{[Equation 3]}$$

The future behavior of a moving specific $n_i$ may be defined by a nonlinear differential equation as shown in Equation 4 below.

$$\dot{s}=f(s,u(t)). \quad \text{[Equation 4]}$$

Referring to FIG. 5, a vehicle included in C1 that recognizes an initial obstacle may communicate with vehicles included in a cluster positioned in the rear of a traveling direction through V2V, and a vehicle included in a cluster included in coverage of RSU may communicate with a control center through the RSU.

Detection and Prediction Module
1) Vehicular Cyber Physical System Model

In the present disclosure, a vehicular cyber physical system model enables a vehicle to recognize the driving environment through communication-based cooperative sensing.

Referring back to FIG. 5, the CNP may communicate through and without infrastructure. For example, in the absence of infrastructure, vehicles may communicate at close range. On the other hand, infrastructure enables both near and far nodes and vehicles to communicate. Vehicle network infrastructure such as a road-side unit (RSU) and a small Ad-hoc network may be used. Each vehicle may continuously detect kinematic information such as a speed, a position, and a direction and share the detected kinematic information with neighbors through a network.

In the present disclosure, a local sensed data (LSD) may refer to sensing data in a vehicle, and a remote sensed data (RSD) may refer to surrounding environment sensing data through a network.

The vehicle may periodically transmit and receive the kinematic information, and the CH may receive and assess the kinematic information to analyze the risk of collision with neighbors in the cluster.

2) Relative Kinematics in Risk Assessment

The CNP enables vehicles to drive safely in highly dynamic city traffic by relying on the relative kinematics between adjacent cars. For example, the CNP allows vehicles to sense the driving environment, detect possible changes, assess the risk of collisions involved, and reconfigure the driving plan to safely adapt to unsafe accidents.

Upon receiving the RSD, the model including the CNP may assess the received kinematic data and detect the presence of a collision risk. When a dangerous obstacle is detected along a road section, the model may classify the actual driving vehicle into two categories such as safety vehicles and emergency vehicles. The safety vehicle is a vehicle driving away from the obstacle location, and the emergency vehicle is a vehicle that is driving to the obstacle position.

The CNP may safely guide emergency vehicles to a safe location without damaging the overall driving safety. For example, a collision time $T_c$ may be used for two adjacent vehicles traveling in the same lane. Here, the $T_c$ may mean a time required for a child vehicle to collide with a parent vehicle when the current speed is maintained.

3) CNP Communication Protocol

In the model of the present disclosure, there are two types of messages for CNP services such as a cooperation context message (CCM) and an emergency context message (ECM).

In the present disclosure, we propose a lightweight data sharing protocol that uses a new IPv6 neighbor discovery (ND) option for vehicle mobility information called a vehicle mobility information (VMI) option. For example, a CAN service including the VMI option may include the CCM and ECM messages.

The CCM is a message that delivers vehicle motion information (for example, position, speed, acceleration/deceleration, direction) and driver's driving motion (for example, braking and acceleration) to adjacent vehicles for cooperative driving. The ECM is a message notifying adjacent vehicles of emergency situations (for example, accident and danger situations). Since the ECM has a higher priority than the CCM, the ECM needs to propagate faster than the CCM in the vehicle network.

FIG. 6 is an exemplary diagram of a VMI option format to which the present disclosure can be applied.

Referring to FIG. 6, the vehicle mobility information (VMI) option is an IPv6 ND option for transmitting the CCM or ECM.

Table 1 exemplifies fields of VMI option format.

TABLE 1

| Fields | Descriptions |
| --- | --- |
| Type | 8-bit identifier of VMI option type allocated in IANA: TBD |
| Length | Integer without 8-bit code. Length (including type and length field) of option is units of 8 octets. Value is 3. |
| Message | 8-bit identifier of VMI message type composed of CCM(0) and ECM(1). |
| Reserved1/2 | This field is not used. Sender needs to be initialized to zero and receiver needs to ignore it. |
| Mobility Information | 128-bit mobility information. The CCM includes vehicle motion information (for example, position, speed, acceleration/deceleration, direction) and driver's traveling motion (for example, braking and acceleration). Further, it also includes vehicle emergency information (for example, obstacle information and accident information). |

The CCM of the VMI option may be included in a neighborhood advertisement (NA) message that is periodically transmitted by a vehicle to notify its existence.

The ECM of the VMI option may be included in the NA message that the vehicle transmits to its one-hop neighboring vehicle to immediately notify an emergency situation.

In order to ensure that vehicles may take immediate action in an emergency situation, the ECM has a higher priority than the CCM. Therefore, if there is the ECM and a CCM to be transmitted to the vehicle, the ECM needs to transmitted earlier than the CCM.

Upon receiving the ECM and CCM, the CNP recognizes the message information and analyzes the risk of road driving conditions. This communication serves to detect and identify obstacles ahead in the driving lane.

Each vehicle periodically shares a CCM recognition message. The CCM holds basic mobility information of the sender and its neighbors.

FIG. 7 illustrates dynamic path planning of a CH to which the present disclosure can be applied.

Referring to FIG. 7, when there is an obstacle on a road, the CH shares a message with a high priority through a channel for safety purposes. For example, multi-channel communication may be used to prioritize the ECM.

For example, the CH selects a cluster of vehicles. The CH may control handles of members of the cluster. When the CH receives the ECM, the CH may analyze the risk and acts as a member performing the next movement accordingly.

4) Probabilistic Risk Assessment

The CNP may control the vehicle according to the collision probability of the emergency vehicle. Here, the collision probability may refer to the risk that a moving vehicle collides with an obstacle in front of the moving vehicle. This collision probability may be calculated through the above-described $T_c$.

FIG. 8 illustrates a collision scenario to which the present disclosure can be applied.

Referring to FIG. 8, a scenario in which a child vehicle drives toward a parent vehicle is illustrated. While the current condition where $V_c$ is $V_p$ is maintained, $T_c$ at which the child vehicle collides with the parent vehicle may be calculated through Equation 5 below.

$$T_c = \frac{D(n_c, n_p)}{M(n_c, n_p)}. \quad \text{[Equation 5]}$$

Referring to Equation 5, D ($n_c$, $n_p$) is a distance between the child vehicle and the parent vehicle, and M ($n_c$, $n_p$) is a relative speed between the child vehicle and the parent vehicle.

When the vehicle accelerates to an obstacle to the maximum, a minimum value of the collision time may be defined as $T_{cmin}$, and when the vehicle accelerates to the obstacle to the minimum, a maximum value of the collision time may be defined as $T_{cmax}$.

Assuming that a collision probability of a certain vehicle is evenly distributed in $Tc \in [T_{cmin}, T_{cmax}]$, the collision probability may be calculated through Equation 6 below.

$$P(n_c \otimes n_p) = \begin{cases} 1, & \text{if } T_c \leq T_{cmin} \quad (8a) \\ 0, & \text{if } T_c \geq T_{cmax} \quad (8b) \\ P_{cp}, & \text{otherwise}, \quad (8c) \end{cases} \quad \text{[Equation 6]}$$

(8c) is a collision risk level when the child vehicle moves to the parent vehicle, and may be calculated through Equation 7 below.

$$P_{cp} = 1 - \left( \frac{T_c - T_{cmin}}{T_{cmax} - T_{cmin}} \right) \quad \text{[Equation 7]}$$

A vehicle in an emergency situation may collide with other vehicles in a range in which a visual field is not secured as well as in an unsafe range.

FIG. 9 illustrates a collision probability graph of an emergency vehicle to which the present disclosure can be applied.

Referring to FIG. 9, a vehicle driving in an emergency lane with adjacent lanes on the left and right may be assumed. For example, the CH may control a vehicle $n_1^E$ to maneuver laterally in a lane with the least risk.

5) Lane Selection Based on Lane Quality

Referring back to FIG. 9, the collision probability between each of the child vehicles of a lane (for example, a left neighboring lane, a right neighboring lane) and their parent vehicle may be calculated. These probabilities for each lane may be considered independently. The vehicle $n_1^E$ may select a lane with the best quality in consideration of the collision probability for each lane.

For example, the quality of the left adjacent lane may be calculated through Equation 8 below.

$$Q_L = \sum_{i=1}^{u} \frac{1}{p_i} \quad \text{[Equation 8]}$$

However, the quality of such a lane may not be applied to a lane where there is a significant difference in a relative distance and speed between a pair of child vehicle and parent vehicle.

FIG. 10 illustrates the lane quality to which the present disclosure can be applied.

Referring to FIG. 10, two vehicles travel in the left lane and the other two vehicles travel in the right lane. According to Equation 8 described above, the quality of the left lane is 4, and the quality of the right lane is 11. When the vehicle $n_1^E$ moves to the right lane, a collision will inevitably occur. To solve this, the concept of safe lane probability is additionally required.

The safety lane quality is a concept representing the state of the lane safety.

For example, when $q_i$ is the safety lane probability of the child vehicle facing the parent vehicle, $q_i$ may be calculated through Equation 9 below.

$$q_i = 1 - p_i, \quad \text{[Equation 9]}$$

In addition, the quality of the safety lane of the left lane may be calculated through Equation 10 below.

$$S_L = \prod_{i=1}^{u} q_i \quad \text{[Equation 10]}$$

Referring back to FIG. 10, since the safety lane quality of the left lane is 0.25 and the safety lane quality of the right lane is 0, the vehicle $n_1^E$ will select movement to the left lane.

FIG. 11 illustrates an algorithm of determining an emergency maneuvering lane to which the present disclosure can be applied.

Referring to FIG. 11, the CH may have necessary mobility information of vehicles. The CH initializes the parent node on line 2, and calculates the risk of nodes in graph G that have a parent-child relationship on lines 3 to 6. Lines 7 and 8 initialize the maneuvering lane and the corresponding cost, and the cost of the maneuvering lane needs to be the highest among adjacent lanes. Lines 9 to 15 compare the lane quality to select the best lane and control a vehicle to face the selected lane.

In terms of the complexity of the algorithm, the level used in the suboptimal quality calculation may be limited to 3. For example, the risk of collision between three nodes in a left lane and three nodes in a right lane closest to an obstacle may be considered.

In addition, the CH may determine the emergency maneuvering lane in consideration of the density of the lane.

For example, when both adjacent lanes do not have a collision risk or have the same collision risk, a vehicle may move to a less dense lane.

In addition, the selection of the maneuvering lane needs to satisfy Equation 11 below in consideration of the above-described safety lane quality.

$$L_\alpha = \arg\max_{x \in \{L,R\}} (S_L, S_R). \quad \text{[Equation 11]}$$

Emergency Maneuvering Plan

When a member is in danger of colliding with an obstacle ahead, the CH can perform an emergency operation to prevent collision. The CH may recognize the mobility such as the position and speed direction of each adjacent vehicle, and may adjust the maneuverability of the CM that is the farthest from the CM closest to the obstacle. This maneuverability may define a target position in the maneuvering lane in order to avoid collisions with obstacles or other driving nodes.

To this end, a reference path may be calculated.

For example, the vehicle may follow the reference path during the maneuver time, and the target position may mean an ending point of the reference path. In addition, the CNP can track a vehicle's trajectory at specific times in order to check whether the vehicle follows the reference path. Through this, the CNP may control the vehicle in consideration of the risk of collision with other vehicles as well as obstacles.

FIG. 12 illustrates an emergency vehicle tracking method to which the present disclosure can be applied.

Referring to FIG. 12, a driving adjustment procedure of the CNP may be performed through modularized steps.

1) Data sensing: Consist of transmitting and receiving mobility information through self-sensing and remote sensing according to the CNP communication protocol.

2) Risk assessment: The CH of the cluster recognizes and analyzes the received data to detect abnormal motion in the driving environment. For example, these assessments can determine the presence of obstacles on the road, a collision avoidance mode, and a maneuver mode that the CM will employ.

3) Path maneuver: For all CMs, the CH may define and adjust the maneuver strategy in step 3 of FIG. 12. The CNP defines the input to move the vehicle to the appropriate maneuvering lane. The cluster member positioned in the maneuvering lane may accelerate or decelerate in order to avoid a collision with a vehicle entering the maneuvering lane.

4) Path tracking: When the maneuvering path is defined, the path is tracked in step 4 of FIG. 12 so that the path can be maintained until the vehicle reaches the target without deviation.

This maneuvering information is shared, and may serve as a sensing input for a vehicle that has newly arrived on a road.

A plurality of vehicles traveling toward the obstacle may be directly or indirectly affected by the obstacle. For example, vehicles (that is, emergency vehicles) that are directly affected are vehicles that may collide with obstacles when the current trajectory is maintained. A vehicle that is indirectly affected is a vehicle that is affected by the maneuvering trajectory of the emergency vehicle.

In order for the emergency vehicle to reach the target position and prevent additional accidents, the emergency speed needs to be determined. To this end, the target position may be positioned in the middle of the maneuvering lane determined by the CNP.

The maneuvering inputs for a minimal vehicle direction and speed changes needs to ensure a perimeter for safely bypassing obstacles. Assuming that the speed of the vehicles in the rear is constant, a emergency control input value u may be obtained by selecting a minimum steering angle of contour lines toward the target position, referring to Equation 12.

$$u = \min\left(\begin{bmatrix}\rho^1 \\ a^1\end{bmatrix}, \begin{bmatrix}\rho^2 \\ a^2\end{bmatrix}, \cdots, \begin{bmatrix}\rho^k \\ a^k\end{bmatrix}\right) \quad \text{[Equation 12]}$$

where $\rho$ = steering angle input, $a$ = acceleration input, $\begin{bmatrix}\rho^j \\ a^j\end{bmatrix}$, $j \le k$ = contour definition inputs.

Minimal Contour Polygon Area of Vehicle

The minimum contour polygon area of the vehicle may be a range formed by a series of positions that may be reached within a certain time when the vehicle is traveling with a certain range of steering angles. For example, if the position in the current path is $P_t$, then the next position $P_{t+\delta_t}$ may be calculated as in Equation 13 below.

$$P_{t+\delta_t} = P_t + f_{\delta_t}(a_t - \rho_t) \quad \text{[Equation 13]}$$
$$= (x_t, y_t) + v_t \delta_t (\cos(\theta_{t+\delta_t}), \sin(\theta_{t+\delta_t})),$$

Here, $\theta_{t+\delta_t} = \theta_t + \dfrac{v_{t+\delta_t}}{L\tan(\rho_t)}$ and, $v_{t+\delta_t} = v_t + a_t \delta_t$.

While selecting the emergency maneuvering lane, the emergency vehicle may consider the previous traveling of another vehicle so as not to collide with another vehicle.

FIGS. 13A and 13B are exemplary diagrams of a maneuver operation of a CM to which the present disclosure can be applied.

Referring to FIG. 13A, the emergency vehicle may maneuver to avoid a collision with an obstacle. The CNP may prioritize lateral movement towards suitable adjacent lanes. The longitudinal movement may only be performed if the lateral change is not possible.

FIG. 13B illustrates maneuvering of a vehicle traveling on the maneuvering lane.

Minimize Collision Intensity

The collision intensity minimization mechanism is to minimize energy transfer between collision vehicles and to limit the number of vehicles involved in a collision as much as possible. For example, the severity of the collision may be proportional to the weight and speed of the two colliding vehicles. This equivalent energy speed (EES) may be calculated through Equation 14 below.

$$EES = v_r - v_{ob} = \frac{2m_e}{m_e + m_{ob}}(v_e - v_r). \quad \text{[Equation 14]}$$

Referring to Equation 14, assuming that an obstacle has a velocity $v_{ob}$ and a mass $m_{ob}$, and collides with a node having ve and me, after the collision, when the approximate result velocity $v_r$ is known, the EES may be calculated. In the case of the collision in the lane change, the EES may be calculated by calculating a speed through a cosine value of the entering angle.

In the collision, the greater the difference in vehicle speed, the more severe the collision and the higher the mortality rate. By decelerating the collision vehicle just before the collision, the energy transfer between the collision vehicles may be reduced. Therefore, in order to minimize the collision intensity, the CNP needs to reduce the speed of the vehicle until immediately before the collision when the collision cannot be avoided by maneuvering. Through Equation 15 below, the reduction in energy transfer between the collision vehicles may be calculated.

$$Dec = \frac{v_r - v_e}{\Delta_t}. \quad \text{[Equation 15]}$$

In addition, the EES may be reduced by reducing the number of vehicles involved. Thus, the CNP may limit the number of vehicles involved.

For example, the CNP may quickly advertise a collision to neighboring vehicles to quickly assess the risk of a collision and develop a maneuvering plan in a timely manner. For this, the calculated $\Delta_t$ in Equation 15 may be used.

For example, new vehicles introduced during $\Delta_t$ can also be warned to bypass obstacles.

FIG. 14 Illustrates an Embodiment to which the Present Disclosure can be Applied.

Referring to FIG. 14, a first vehicle may refer to CH, and member vehicles in a cluster may be controlled through the CNP. The second vehicle may be a CM or may be an emergency vehicle that has found an obstacle.

The first vehicle receives mobility information from surrounding vehicles (S1410). For example, the first vehicle may receive the mobility information of the second vehicle. The mobility information may include 1) cooperation context message (CCM) or 2) emergency context message (ECM). In more detail, the CCM may include the motion information of the second vehicle, and the ECM may include the information indicating the emergency situation related to the second vehicle. Such mobility information may include fields as illustrated in FIG. 6.

The ECM may have a higher priority value than the CCM. For example, the ECM may be included in the mobility information before CCM and transmitted.

The first vehicle controls traveling based on the movement information (S1420). For example, the first vehicle may also perform traveling control of not only itself but also cluster members. In more detail, the first vehicle measures an emergency situation based on a message field of FIG. 6 indicating the ECM, and calculates a strategy for maneuvering the member vehicles based on the measured emergency situation. Based on the strategy, the control message may be transmitted to the member vehicles.

In order to measure the emergency situation, the first vehicle may detect an obstacle related to the emergency situation, calculate the collision probability related to the obstacle, and determine a mode for avoiding a collision using the received mobility information or sensing data. The collision probability may include not only a direct collision with an obstacle, but also a collision probability between the parent vehicle and the child vehicle described above, and a collision probability generated by maneuvering in a different lane.

In addition, in order to calculate the strategy, the first vehicle may calculate a reference path for maneuvering member vehicles.

General Devices to which the Present Disclosure can be Applied

FIG. 15 illustrates a general device to which the present disclosure can be applied.

Referring to FIG. 15, a server X200 according to the proposed embodiment may be a multi-access edge computing (MEC) server, a cloud server, a traffic control server, or a cloud for a vehicle. In addition, it may include the RSU. It may also include a communication module X210, a processor X220, and a memory X230. The communication module X210 may also be referred to as a radio frequency (RF) unit. The communication module X210 may be configured to transmit various signals, data and information to an external device and to receive various signals, data and information to an external device. The server X200 may be connected to the external device in a wired and/or wireless manner. The communication module X210 may be implemented by being separated into a transmitter and a receiver. The processor X220 may control the overall operation of the server X200, and may be configured to allow the server X200 to perform a function of computing information to be transmitted/received and the like to and from the external device. In addition, the processor X220 may be configured to perform the operation of the server proposed in the present disclosure. The processor X220 may control the communication module X110 to transmit data or a message to the user equipment (UE), another vehicle, or another server according to the proposal of the present disclosure. The memory X230 may store the computed information and the like for a predetermined time and may be replaced with a component such as a buffer. The server X200 may include the above-described RSU and MA.

In addition, the specific configuration of the terminal device X100 and the server X200 as described above may be implemented so that the matters described in various embodiments of the present disclosure are applied independently or two or more embodiments may be applied simultaneously, and duplicate contents are omitted for clarity.

In the embodiments described hereinabove, components and features of the present disclosure were combined with each other in a predetermined form. It is to be considered that the respective components or features are selective unless separately explicitly mentioned. The respective components or features may be implemented in a form in which they are not combined with other components or features. In addition, some components and/or features may be combined with each other to configure the embodiment of the present disclosure. The order of operations described in the embodiments of the present disclosure may be changed. Some components or features of any embodiment may be included in another embodiment or be replaced by corresponding components or features of another embodiment. It is obvious that claims that do not have an explicitly referred relationship in the claims may be combined with each other to configure an embodiment or be included in new claims by amendment after application.

Embodiments of the present disclosure may be implemented by various means, for example, hardware, firmware, software, or a combination thereof, and the like. In the case in which an embodiment of the present disclosure is implemented by the hardware, it may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which one embodiment of the present disclosure is implemented by the firmware or the software, it may be implemented in a form of a module, a procedure, a function, or the like, performing the capabilities or the operations described above. A software code may be stored in a memory and be driven by a processor. The memory may be positioned inside or outside the processor and transmit and receive data to and from the processor by various well-known means.

It will be apparent to those skilled in the art that the present disclosure may be embodied in other specific forms without departing from the spirit and essential characteristics of the present disclosure. Therefore, the above-mentioned detailed description is to be interpreted as being illustrative rather than being restrictive in all aspects. The scope of the present disclosure should be determined by reasonable interpretation of the appended claims, and all changes within the equivalent scope of the present disclosure are included in the scope of the present disclosure.

The present disclosure may be applied to various vehicle network systems.

According to the present disclosure, it is possible to provide the CNP that increases the safety of a vehicle traveling on a road.

In addition, it is possible to provide the control method necessary in the dangerous situation to the vehicle by analyzing the driving risk of the vehicle through the CNP.

Effects which can be achieved by the present disclosure are not limited to the above-mentioned effects. That is, other objects that are not mentioned may be obviously understood by those skilled in the art to which the present disclosure pertains from the following description.

What is claimed is:
1. A method for performing communication with a first vehicle in a vehicle network, the method comprising:
receiving, by the first vehicle, mobility information from a second vehicle, the mobility information including a cooperation context message (CCM) or an emergency context message (ECM); and
controlling, by the first vehicle, driving member vehicles of a cluster based on the mobility information, wherein the CCM includes motion information of the second vehicle, and the ECM includes information for notifying an emergency situation related to the second vehicle,
wherein the mobility information includes an identifier composed of a predetermined number of bits indicating message types of the CCM and the ECM,
wherein the mobility information further includes motion information related to a mobility of the second vehicle and the emergency situation,
wherein the predetermined number of bits for the identifier are 8-bits,
wherein the ECM has a higher priority value than the CCM, and
wherein the ECM is included in the mobility information and transmitted earlier than the CCM, based on the priority value.

2. The communication method of claim 1, wherein the controlling of the driving includes:
measuring, by the first vehicle, the emergency situation based on the identifier indicating the ECM;
calculating, by the first vehicle, a strategy for maneuvering the member vehicles based on the measured emergency situation; and
transmitting, by the first vehicle, a control message to the member vehicles based on the strategy.

3. The communication method of claim 2, wherein the measuring of the emergency situation includes:
detecting, by the first vehicle, an obstacle related to the emergency situation;
calculating, by the first vehicle, a collision probability related to the obstacle; and
determining, by the first vehicle, a mode for avoiding the collision and a mode for maneuvering the member vehicles based on the mobility information received from the second vehicle.

4. The communication method of claim 2, wherein the calculating of the strategy includes:
calculating, by the first vehicle, a reference path for maneuvering the member vehicles.

5. A vehicle that performs communication in a vehicle network, the vehicle being a first vehicle comprising:
a transceiver;
a memory; and
a processor configured to control the transceiver and the memory, wherein the processor is further configured to:
receive, from a second vehicle, mobility information of the second vehicle through the transceiver, the mobility information including a cooperation context message (CCM) or an emergency context message (ECM), and
control driving member vehicles of a cluster based on the mobility information,
wherein the CCM includes motion information of the second vehicle, and the ECM includes information for notifying an emergency situation related to the second vehicle,
wherein the mobility information includes an identifier composed of a predetermined number of bits indicating message types of the CCM and the ECM,
wherein the mobility information further includes motion information related to a mobility of the second vehicle and the emergency situation,
wherein the predetermined number of bits for the identifier are 8-bits,
wherein the ECM has a higher priority value than the CCM, and wherein the ECM is included in the mobility information and transmitted earlier than the CCM, based on the priority value.

6. The vehicle of claim 5, wherein the processor is configured to:
   measure the emergency situation based on the identifier indicating the ECM,
   calculate a strategy for maneuvering the member vehicles based on the measured emergency situation, and
   transmit a control message to the member vehicles based on the strategy, in order to control the driving.

7. The vehicle of claim 6, wherein the processor is configured to:
   detect an obstacle related to the emergency situation,
   calculate a collision probability related to the obstacle, and
   determine a mode for avoiding the collision and a mode for maneuvering the member vehicles based on the mobility information received from the second vehicle, in order to control the driving.

8. The vehicle of claim 6, wherein the processor is configured to calculate a reference path for maneuvering the member vehicles to calculate the strategy.

* * * * *